(12) United States Patent
Love et al.

(10) Patent No.: US 11,900,067 B1
(45) Date of Patent: Feb. 13, 2024

(54) MULTI-MODAL MACHINE LEARNING ARCHITECTURES INTEGRATING LANGUAGE MODELS AND COMPUTER VISION SYSTEMS

(71) Applicant: SurgeTech, LLC, Austin, TX (US)

(72) Inventors: Michael Love, Marble Falls, TX (US); Blake Love, Austin, TX (US); Tiago Soromenho, Austin, TX (US)

(73) Assignee: SURGETECH, LLC, Austin, TX (US)

( * ) Notice: Subject to any disclaimer, the term of this patent is extended or adjusted under 35 U.S.C. 154(b) by 0 days.

(21) Appl. No.: 18/471,934

(22) Filed: Sep. 21, 2023

Related U.S. Application Data

(63) Continuation of application No. 18/191,746, filed on Mar. 28, 2023, now Pat. No. 11,803,710.

(51) Int. Cl.

| | |
|---|---|
| *G06F 40/35* | (2020.01) |
| *G06V 10/96* | (2022.01) |
| *G06F 16/532* | (2019.01) |
| *G06V 10/764* | (2022.01) |
| *G06V 10/82* | (2022.01) |
| *G06F 40/40* | (2020.01) |
| *G06V 10/774* | (2022.01) |
| *G06V 10/80* | (2022.01) |

(52) U.S. Cl.
CPC .......... *G06F 40/35* (2020.01); *G06F 16/532* (2019.01); *G06F 40/40* (2020.01); *G06V 10/764* (2022.01); *G06V 10/774* (2022.01); *G06V 10/803* (2022.01); *G06V 10/82* (2022.01); *G06V 10/96* (2022.01)

(58) Field of Classification Search
CPC ........ G06F 40/35; G06F 16/532; G06F 40/40; G06V 10/764; G06V 10/774; G06V 10/803; G06V 10/82; G06V 10/96
USPC ......................................................... 382/156
See application file for complete search history.

(56) References Cited

U.S. PATENT DOCUMENTS

| | | | | |
|---|---|---|---|---|
| 10,515,625 | B1* | 12/2019 | Metallinou | G10L 15/26 |
| 11,586,829 | B2* | 2/2023 | Mishra | G06F 40/30 |
| 2018/0276495 | A1* | 9/2018 | Yu | G06N 5/022 |
| 2021/0397899 | A1* | 12/2021 | Watanabe | G06V 10/776 |
| 2022/0129556 | A1* | 4/2022 | Chen | G06F 21/74 |
| 2022/0398794 | A1* | 12/2022 | Lee | G10L 15/26 |
| 2023/0020060 | A1* | 1/2023 | Nishio | H04N 23/55 |
| 2023/0078763 | A1* | 3/2023 | Hata | G06V 20/58 |
| | | | | 382/159 |
| 2023/0099393 | A1* | 3/2023 | Tumuluri | G06F 40/35 |
| | | | | 704/231 |

* cited by examiner

*Primary Examiner* — Juan A Torres
(74) *Attorney, Agent, or Firm* — Bryan Cave Leighton Paisner LLP

(57) ABSTRACT

Improved multi-modal machine learning networks integrate computer vision systems with language models. In certain embodiments, a computer vision system analyzes at least one image to generate a computer vision output. The language model generates an output based, at least in part, on a consideration of the computer vision output. The outputs of the language model can be generated by jointly considering textual information learned by the language model and visual content extracted by the computer vision system, thereby significantly improving the accuracy, breadth, and comprehensiveness of the outputs.

20 Claims, 8 Drawing Sheets

145 – Natural Language Processing (NLP) Tasks

301 – Text Generation Tasks

302 – Language Modeling Tasks

303 – Question Answering Tasks

304 – Text Classification Tasks

305 – Text Summarization Tasks

306 – Speech Recognition Tasks

307 – NER Tasks

308 – Topic Modeling Tasks

FIG. 3

165 – Computer Vision Tasks

401 – Image Classification Tasks

402 – Object Detection Tasks

403 – Object Tracking Tasks

404 – Instance Segmentation Tasks

405 – Semantic Segmentation Tasks

406 – Pose Estimation Tasks

407 – Video Analysis Tasks

408 – Content Generation Tasks

710 – Providing a multi-modal application that includes: (a) a computer vision system configured to execute one or more computer vision tasks and generate computer vision outputs; and (b) a client interface that facilitates interactions between an end-user and a language model that generates textual outputs for communicating with the end-user

720 – Receiving one or more images at the computer vision system

730 – Executing at least one computer vision task on the one or more images using the computer vision system to generate one or more computer vision outputs

740 – Executing, by the language model, one or more natural language processing (NPL) tasks that utilize the one or more computer vision outputs to generate an output in connection with interacting with the end-user

750 – Providing the output to the end-user via the client interface of the multi-modal application

MULTI-MODAL MACHINE LEARNING ARCHITECTURES INTEGRATING LANGUAGE MODELS AND COMPUTER VISION SYSTEMS

CROSS-REFERENCE TO RELATED APPLICATIONS

This application is a continuation of U.S. patent application Ser. No. 18/191,746 filed on Mar. 28, 2023. The content of the aforementioned application is herein incorporated by reference in its entirety.

TECHNICAL FIELD

This disclosure is related to multi-modal machine learning networks that integrate computer vision systems with language models. In certain embodiments, one or more generative pre-trained transformer models can be executed to interact with end-users and optimize outputs based, at least in part, on data or information extracted by a computer vision system.

BACKGROUND

In recent times, various language models have been developed to interact with users. In some examples, these language models may represent machine learning models that operate as chatbots. These AI chatbots can be trained to understand textual inputs received from users, and generate responses to queries received from the users. These language models are typically implemented as single modal systems that process textual content (e.g., single modal systems that receive a single type of input in the form of text to generate outputs or responses).

Because these single modal language models rely on a single type of input, the ability of these systems to generate outputs is limited to information that can be extracted from textual content. These systems are unable to consider additional information that can be extracted from visual content, which, in many scenarios, can provide a more complete understanding (or can help to fill in knowledge gaps) on a particular topic that is being considered by the language model. As such, the responses or outputs generated by these language models may not provide a complete picture and/or may fail to consider important details that can only be gleaned from visual content or images.

BRIEF DESCRIPTION OF DRAWINGS

To facilitate further description of the embodiments, the following drawings are provided, in which like references are intended to refer to like or corresponding parts, and in which:

FIG. 3 is a block diagram illustrating exemplary natural language processing tasks that can be executed by a language model in accordance with certain embodiments;

FIG. 4 is a block diagram illustrating exemplary computer vision tasks that can be executed by a computer vision system in accordance with certain embodiments;

FIG. 7 is a flowchart illustrating an exemplary method in accordance with certain embodiments.

Figure 1A:
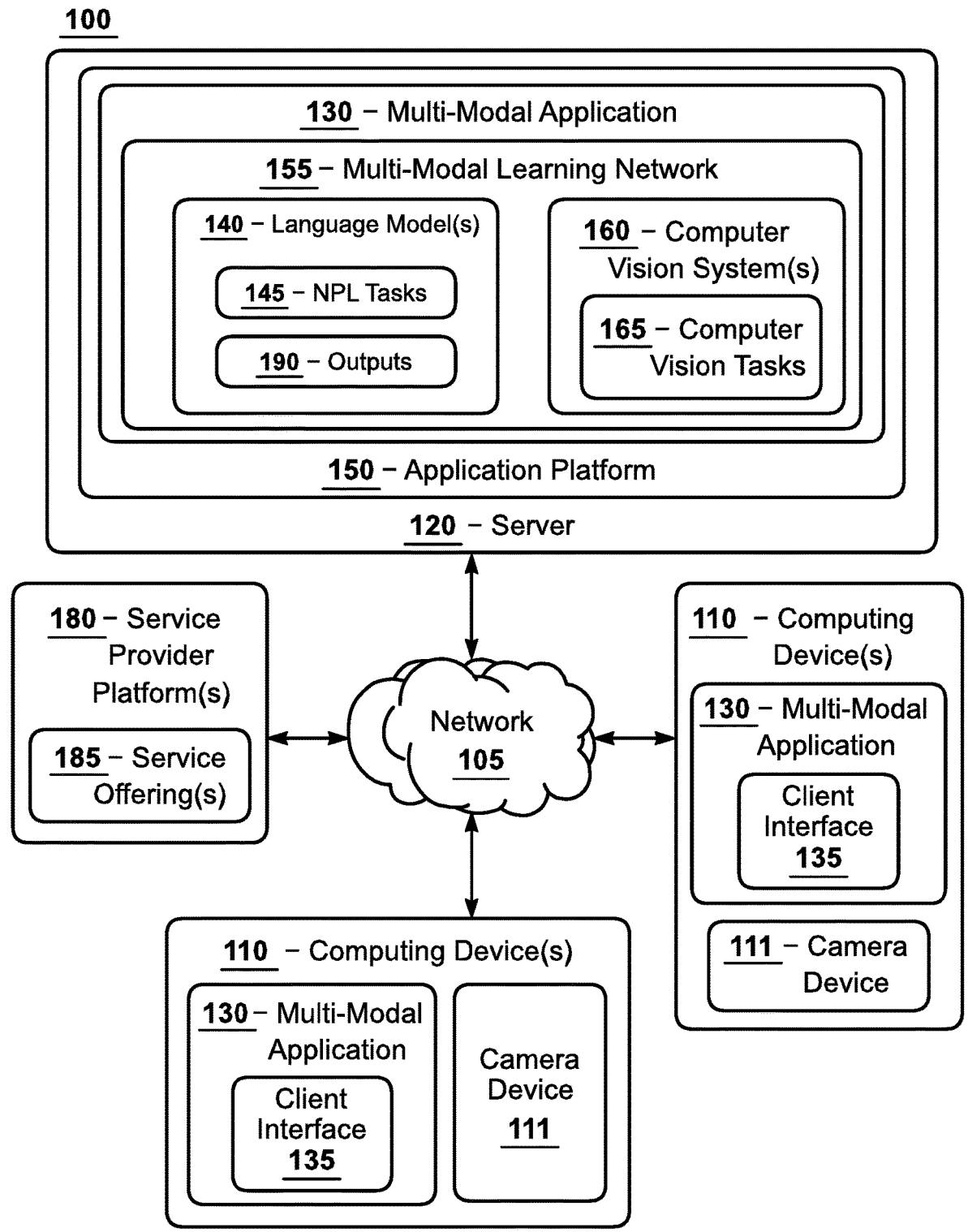
FIG. 1A is a diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION OF EXEMPLARY EMBODIMENTS

The present disclosure relates to systems, methods, apparatuses, computer program products, and techniques for integrating computer vision systems with language models. The integration of a computer vision system with a language model can enable the language model to utilize visual content (e.g., such as images and videos) in generating outputs, along with the textual content learned by the language model. The outputs of the language model can be generated by jointly considering the information obtained from both modalities, thereby significantly improving the accuracy, breadth, and comprehensiveness of the outputs.

In certain embodiments, a multi-modal application utilizes both a language model and a computer vision system to generate outputs that can be based on an analysis of both visual content extracted by the computer vision system and textual content learned by the language model. In some scenarios, a front-end of the multi-modal application can be installed on, and executed by, devices operated by end-users, and a back-end of the multi-modal application can be stored and executed by one or more servers. The computer vision system and language model can be provided or accessed by the back-end of the multi-modal application, and front-end of the multi-modal application can include a client interface.

The client interface included on the front-end of the multi-modal application facilitates interactions between the language model and end-users. For example, in response to inputs received from end-users via the client interface, the language model can generate responsive outputs, which can be presented to the end-users via the client interface. Additionally, as explained in further detail below, the language model also can be configured to proactively or preemptively generate outputs without being prompted by the end-users. These preemptive outputs can be presented to the end-users via the client interface to provide the end-users with various types of information, such as information related to service offerings and/or other information that may be of interest to the end-users.

Some or all of the outputs generated by the language model can be based, at least in part, on outputs generated by the computer vision system. The manner in which the computer vision (CV) outputs are utilized to enhance the language model outputs can vary significantly as discussed throughout this disclosure. In some examples, a computing device (e.g., a smart phone or mobile device) operated by an end-user can capture one or more images, and information extracted from the one or more images can be utilized by the language model to enhance current or future exchanges with the end-user. In one example, the CV outputs can be utilized by the language model to generate responsive outputs reactive to inputs provided by end-users during ongoing exchanges between the language model and the end-users. In another example, the CV outputs can be continuously fed to the learning mechanism of the language model, and previously collected CV outputs can be leveraged by the language model to generate outputs in future exchanges with the end-users. In further examples, the CV outputs can be utilized by the language model to generate preemptive outputs that are presented to the end-users automatically in response to the language model detecting certain events. In further examples, an end-user can request information from the language model related to images and/or video sequences (e.g., requests for video summarizations, searches on image databases, etc.) and the language model 140 can generate outputs based on the CV outputs generated by the computer vision system. Many other examples will be apparent based on a review of this disclosure.

The configuration of the computer vision system can vary. In some embodiments, the computer vision system can include one or more convolutional neural networks (CNN). Additionally, or alternatively, the computer vision system 160 can include one or more support vector machines (SVMs) models, one or more decision tree models, one or more random forest models, one or more recurrent neural networks (RNNs), one or more generative adversarial networks (GANs), and/or other types of computer vision models and networks. Additionally, in some scenarios, the computer vision system can include a single learning model and, in other scenarios, the language model can be comprised of multiple learning models that cooperate together.

Regardless of its implementation, the computer vision system can be configured to execute deep learning functions on the images to perform a variety of computer vision tasks. Exemplary computer vision tasks can include image classification tasks, object detection tasks, object tracking tasks, instance segmentation tasks, semantic segmentation tasks, pose estimation tasks, video analysis tasks, content generation tasks, and/or other tasks. In connection with performing these and other computer vision tasks, the computer vision system can generate various outputs that can be utilized by the language model to enhance outputs and interactions with end-users.

The configuration of the language model also can vary. In some embodiments, the language model can include one or more generative pre-trained transformer (GPT) models 141 (e.g., a GPT-1, GPT-2, GPT-3, or subsequently developed GPT model). Additionally, or alternatively, the language model can include one or more BERT (Bidirectional Encoder Representations from Transformers) models, one or more XLNet models, one or more RoBERTa (Robustly Optimized BERT pre-training approach) model, and/or one or more T5 (Text-to-Text Transfer Transformer) models. Additionally, in some scenarios, the language model can represent a single model and, in other scenarios, the language model can be comprised of multiple learning models that cooperate together.

Regardless of its implementation, the language model can be configured to execute a variety of natural language processing (NLP) tasks in connection with interacting with end-users. For example, the language model can be configured to perform NLP tasks including text generation tasks, language modeling tasks, question answering tasks, text classification tasks, text summarization tasks, speech recognition tasks, named entity recognition (NER) tasks, topic modeling tasks, and/or other tasks. One or more these or other NLP tasks can be executed to generate outputs in connection with communicating with the end-users. In doing so, these tasks can utilize the CV outputs to supplement, enhance, and/or improve the language model outputs, The technologies described herein provide a variety of benefits and advantages. One advantage relates to the improved accuracy and/or comprehensiveness of language model outputs that can be generated, at least in part, using the visual information. This can be attributed to the ability of the language model to ingest visual information extracted by the computer vision system, thereby providing "eyes" to the language model and allowing the language model to consider additional dimensions of information. Another advantage is that the outputs generated by the language model can enhance the personalization of outputs presented to each end-user. For example, in some scenarios, the outputs generated for a given end-user can be customized based on both the end-user's previous interactions with the language model (e.g., previous responses, selections, inputs, etc.) and data extracted from images that the end-user captures on a personal computing device (e.g., a mobile device or smart phone). Many other benefits will be apparent based on a review of this disclosure.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
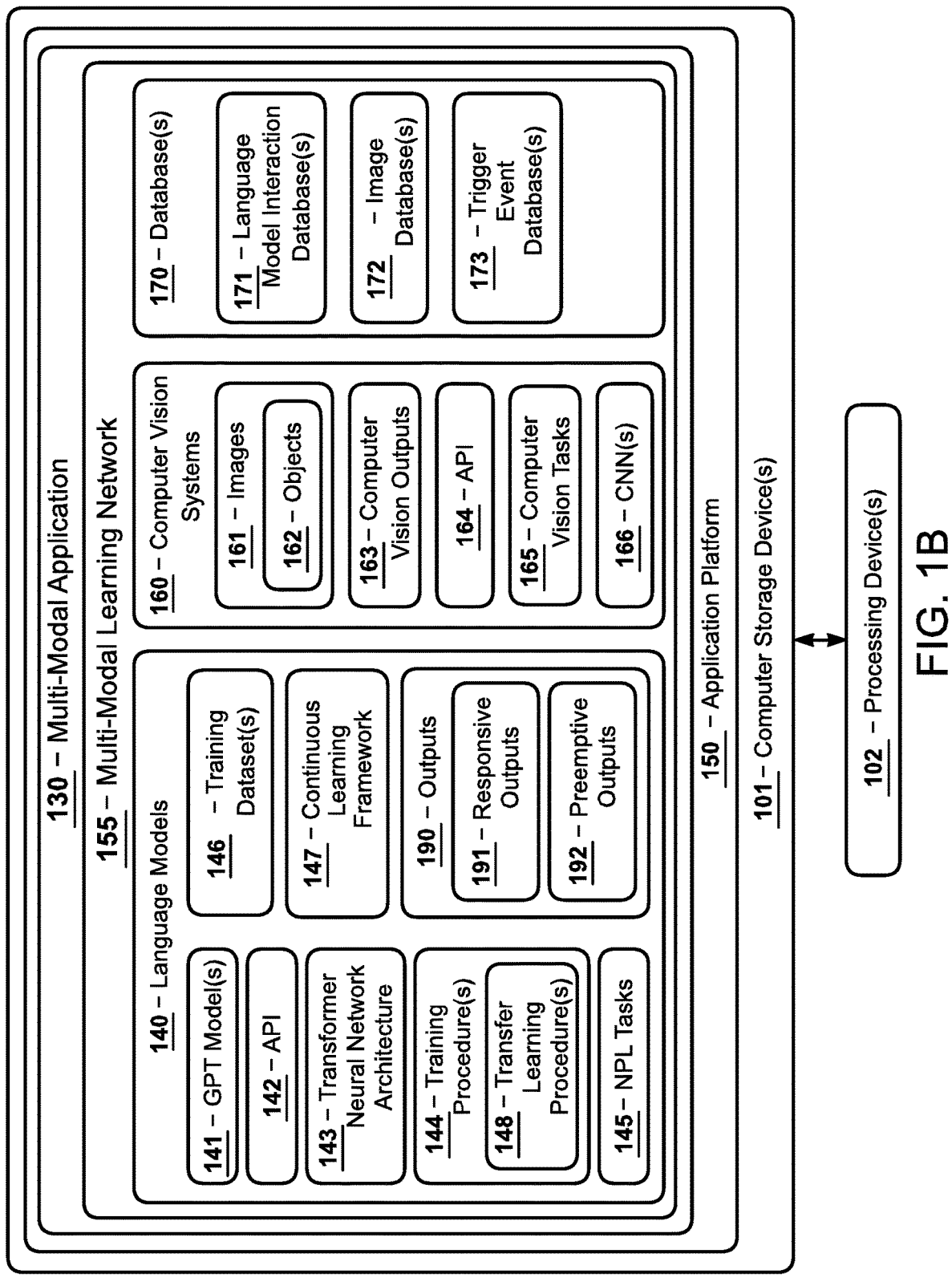
FIG. 1B is a block diagram demonstrating exemplary features of an application platform in accordance with certain embodiments.

FIG. 1A is a diagram of an exemplary system 100 in accordance with certain embodiments. FIG. 1B is a diagram illustrating exemplary features and/or functions associated with multi-modal application 130 according to certain embodiments.

The system 100 comprises one or more computing devices 110 and one or more servers 120 that are in communication over a network 105. An application platform 150 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the computing devices 110, servers 120, language models 140, application platform 150, multi-modal machine learning network 155, computer vision systems 160, and/or service provider platforms 180 can be configured to communicate directly with each other and/or over the network 105 via wired or wireless communication links, or a combination of the two. Each of the computing devices 110, servers 120, language models 140, application platform 150, multi-modal machine learning network 155, computer vision systems 160, and/or service provider platforms 180 can include one or more communication devices, one or more computer storage devices 101, and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices including, but not limited to, instructions associated with executing the multi-modal application 130, the language models 140, multi-modal learning network 155, and/or the computer vision systems 160.

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices 101 may be physical, non-transitory mediums. The one or more computer storage devices 101 can store instructions associated with the multi-modal application 130, the language models 140, multi-modal learning network 155, and/or the computer vision systems 160.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, servers 120, language models 140, application platform 150, multi-modal machine learning network 155, computer vision systems 160, and/or service provider platforms 180 to be connected to the Internet and/or other network. The modem devices can permit bi-directional communication between the Internet (and/or other network) and the computing devices 110, servers 120, application platform 150, and/or service provider platforms 180. In certain embodiments, one or more router devices and/or access points may enable the computing devices 110, servers 120, language models 140, application platform 150, multi-modal machine learning network 155, computer vision systems 160, and/or service provider platforms 180 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, language models 140, application platform 150, multi-modal machine learning network 155, computer vision systems 160, and/or service provider platforms 180 to access the Internet and/or other networks.

In certain embodiments, the computing devices 110 may represent mobile devices (e.g., smart phones, personal digital assistants, tablet devices, vehicular computing devices, wearable devices, or any other device that is mobile in nature), desktop computers, laptop computers, and/or other types of devices. The one or more servers 120 may generally represent any type of computing device, including any of the computing devices 110 mentioned above. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110 and/or service provider platforms 180 over the network 105 (e.g., over the Internet).

In certain embodiments, the application platform 150 can be stored on, and executed by, the one or more servers 120. Additionally, or alternatively, the application platform 150 (or its corresponding functions) can be stored on, and executed by, the one or more computing devices 110. For example, in some instances, the application platform 150 may be stored as a local application on a computing device 110, or integrated with a local application stored on a computing device 110, to implement the techniques and functions described herein. The application platform 150 can be stored on, and executed by, other devices as well. For example, in some instances, the application platform 150 can be integrated with one or more service provider platforms 180 in some scenarios.

In certain embodiments, the one or more computing devices 110 can enable individuals to access the application platform 150 over the network 105. For example, in some cases, a computing device 110 can access the application platform 150 over the Internet via a web browser application. Additionally, or alternatively, a computing device 110 can store and execute a front-end of a multi-modal application 130 that is configured to communicate with a back-end of the multi-modal application 130 that is stored and executed by the application platform 150. The front-end of the multi-modal application 130 can include a client interface 135, and the back-end of the multi-modal application 130 can host or access a multi-modal learning network 155 that includes the language model 140 and the computer vision system 160 discussed herein.

The service provider platforms 180 can generally correspond to systems, networks, and/or devices that provide service offerings 185 to end-users. The service offerings 185 can generally correspond to any type of product and/or service. For example, exemplary service offerings 185 can correspond to ride hailing services, lodging booking services, travel or transportation booking services, ticket-ordering services, parking services, online marketplaces (e.g., which enable end-users to purchase goods and/or services), etc.

In some cases, the service provider platforms 180 can offer service provider applications that enable end-users to access and place orders for the service offerings 185. The service provider applications can be installed on computing devices 110 operated by end-users, and the end-users can utilize the service provider applications to book or place orders for the service offerings 185. For example, in some cases, when an end-user accesses a service provider application, the service provider application can present the end-user with various service options related to a service offering 185, and the end-user can select one or more of the service options to place an order for the service offerings 185.

The application platform 150 can store, host and/or execute a multi-modal application 130 that is configured to facilitate interactions between end-users and a language model 140. In some cases, the application platform 150 can execute a back-end of the multi-modal application 130 that is configured to communicate with a front-end of the multi-modal application 130, which can be stored and executed by the computing devices 110 operated by end-users. The front-end of the multi-modal application 155 can include a client interface 135 that enables end-users operating the computing devices 110 to interact with the application platform 150, including the language model 140 and the computer vision system 160.

As explained throughout this disclosure, the multi-modal application 130 can generate outputs 190 based on a consideration of multiple types of inputs—namely, inputs comprising textual content and/or images 161. For example, a multi-modal application 130 can include a language model 140 that interacts with end-users and which is capable of generating outputs 190 (also referred to as language model outputs) by jointly considering data or information extracted from both textual content and visual content (e.g., images 161). In some instances, the language model 140 can be configured to operate as an artificial intelligence (AI) chatbot that interacts with the end-users. Jointly considering data or information extracted from both textual content and visual content enables the language model 140 to generate more comprehensive outputs 190 and can improve the accuracy of the outputs 190.

The types of outputs 190 generated by the language model 140 can vary. In some instances, the outputs 190 can include responsive outputs 191 that are generated in response to inputs received via the client interface 135 from end-users. For example, these responsive outputs 191 can be generated in response to being prompted by the end-users and can include content that is responsive to requests (e.g., questions, statements, queries, etc.) specified in the inputs provided by the end-users. In some examples, a user input may request information associated with a service offering 185, and the language model 140 can utilize outputs of a computer vision system 160 to generate responsive outputs 191 relating to the service offering 185.

Additionally, the outputs 190 also can include preemptive outputs 192 that are proactively or preemptively transmitted to end-users via the client interface 135 without being prompted by an end-user (e.g., without receiving any prior user inputs). In some examples, the preemptive output 192 also can be generated to present end-users with one or more service offerings 185 and/or information related to one or more service offerings 185 based, at least in part, on outputs of the computer vision system 160.

As explained in more detail below, the language model 140 can be triggered to generate preemptive outputs 192 in response to detecting preemptive events. In some instances, the preemptive events may be detected, at least in part, using data or information that is extracted from one or more images 161 using the computer vision system 160. For example, in response to detecting one or more objects in an image 161 (e.g., objects corresponding to buildings, individuals, and/or service offerings 185), the language model 140 can generate a preemptive output 192 that provides information to an end-user (e.g., information identifying available service offerings 185, coupons, advertisements, etc.).

The preemptive events also may be detected based on preferences of end-users that are learned by the language model 140. For example, the language model may learn that an end-user routinely engages in a transaction for a particular service offering 185 (e.g., ride hailing services, hotel accommodations, etc.) when that end-user is located in a particular geographic area (e.g., at a specific longitude/latitude) and/or at a particular time of day each weekday. When the language model 140 detects a preemptive event indicating that the end-user is located at the geographic area and/or indicating that the time of day is near, the language model 140 can generate and present a preemptive output 192 to present the end-user with options for scheduling or ordering the service offering 185. These preemptive outputs 192 can be enhanced using information provided by the computer vision outputs 163.

In certain embodiments, the language model 140 can communicate with one or more service provider platforms 180 to obtain information that aids the language model 140 in generating the outputs 190. For example, in scenarios where an end-user submits a query via the client interface 135 requesting information relating to one or more service offerings 185, the language model 140 can initiate a communication exchange with one or more service provider platforms 180 and generate a responsive output 191 based, at least in part, on the information received from the one or more service provider platforms 180. Similarly, in scenarios when the service provider platform 180 detects one or more preemptive events, the language model 140 can proactively initiate a communication exchange with one or more service provider platforms 180 to obtain information related to one or more service offerings 185. The language model 140 can then generate a preemptive output 192 that is based, at least in part, on the information obtained from the one or more service provider platforms 180. In either scenario, the outputs 190 (both responsive outputs 191 and preemptive outputs 192) also can be based, at least in part, on computer vision outputs 163 generated by computer vision system 160 (e.g., based on an analysis of images corresponding to the service offerings 185).

In certain embodiments, the client interface 135 presented via the front-end of the multi-modal application 130 enables an end-user to communicate and/or interact with the language model 140 (or multiple language models that cooperate together). The language model 140 can be trained to understand and generate human language. For example, the language model 140 can operate as a chatbot that is configured to interpret questions and/or statements input via the client interface 135, and generate responsive outputs 191 that are output or displayed via the client interface 135. Likewise, the chatbot can generate preemptive outputs 192 to initiate communications or interactions with the end-users. As explained throughout this disclosure, the language model 140 can generate these responsive outputs 191 and preemptive outputs 192 using computer vision outputs 163 that are generated by the compute vision system 160.

The interactions between the end-users and language model 140 can be stored in one or more databases 170, such as a language model interaction database 171. The language model interaction database 171 can store any or all information related to the interactions, and can correlate the interaction information with corresponding end-users. For each end-user, the language model interaction database 171 can store any outputs 190 (both responsive and preemptive outputs) generated by the language model 140, any inputs received from the end-user via the client interface 135, service offerings 185 presented or discussed during the interactions, and/or other data relating to the interactions.

In certain embodiments, the multi-modal application 130 can communicate with the language model 140 via an application programming interface (API) 142. For example, in some cases, the language model 140 can be developed or provided by a third-party (e.g., such as the ChatGPT service offered by OpenAI®) and the multi-modal application 130 can transmit inputs (e.g., voice and/or text-based inputs) received from end-users to the API 142, and can receive outputs 190 from the language model 140 via the API 142. Additionally, or alternatively, the language model 140 can be integrated directly into the user multi-modal application 130 and/or can be he hosted by the application platform 150.

Various types of language models 140 can be utilized by the multi-modal application 130. In some embodiments, the language model 140 can include a generative pre-trained transformer (GPT) model 141 (e.g., a GPT-1, GPT-2, GPT-3, or subsequently developed GPT model). Additionally, or alternatively, the language model 140 can include a BERT (Bidirectional Encoder Representations from Transformers) model, an XLNet model, a RoBERTa (Robustly Optimized BERT pre-training approach) model, and/or a T5 (Text-to-Text Transfer Transformer) model. These or other types of machine learning or AI language models can be used to implement the language model 140. Additionally, it should be recognized that, in some embodiments, the language model 140 can represent a single model and, in other embodiments, the language model 140 can be comprised of multiple learning models (including any combination of the aforementioned models) that cooperate together.

In some cases, an end-user can provide text inputs and/or voice inputs to interact with the language model 140. For example, an end-user may provide text inputs via a touch screen, physical keyboard, digital keyboard, or by other means. Additionally, an end-user can provide voice inputs (or audio-based inputs) via a microphone included on a computing device 110 that is operated by the user. In some embodiments, speech recognition software can be executed to convert the voice inputs to text inputs, which can then be provided to the language model 140. When an end-user interacts with language model 140, the input initially can be tokenized into a sequence of words (or sub-words), which are then processed by the language model 140 to generate a response.

In certain embodiments, the language model 140 can include a transformer neural network architecture 143 that includes a self-attention mechanism, which allows the model to weigh the importance of different parts of the input when generating its output or response. The self-attention mechanism allows the model to selectively focus on different parts of the input when generating its output or response, rather than relying on a fixed context window like other language models. Additionally, the transformer neural network architecture 143 can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures 144 can be utilized to train the language model 140. In some cases, one or more supervised or semi-supervised training procedures 144 can be utilized to train the language model 140. Additionally, or alternatively, one or more unsupervised training procedures 144 can be utilized to train the language model 140.

In some embodiments, the language model 140 is trained via a self-supervised training procedure 144 that includes both an unsupervised training phase and a supervised training phase. The unsupervised training phase can include a pre-training step in which the learning model 140 is trained on a large corpus of text to learn patterns and relationships between words, phrases, sentences, and/or other human language elements. The supervised training phase can be used for fine-tuning and can train the language model 140 using one or more labeled datasets to facilitate learning of specific natural language processing (NLP) tasks 145, such as language translation, language generation, question answering, text classification, text summarization, etc. In certain embodiments, the training datasets 146 can be derived from a text corpus accumulated from multiple sources, such as web pages, books, academic articles, news articles, and/or other text-based works.

FIG. 3 discloses exemplary NLP tasks 145 that can be learned by the language model 140 in accordance with certain embodiments. The exemplary NLP tasks 145 can include text generation tasks 301, language modeling tasks 302, question answering tasks 303, text classification tasks 304, text summarization tasks 305, speech recognition tasks 306, named entity recognition (NER) tasks 307, topic modeling tasks 308 and/or other tasks. Each of the tasks can be utilized to generate various types of language model outputs 190.

The text generation tasks 301 executed by the language model 140 can generally involve generating natural language text (e.g., based on given inputs or prompts from end-users). In some cases, the language model 140 can include a generative model (e.g., a GPT model 141) to generate language model outputs 190 that include the natural language text.

The language modeling tasks 302 executed by the language model 140 can generally involve generating language model outputs 190 that predict a next word or sequence of words in text based on the context of preceding words. In some cases, the language model 140 can include a statistical language model or deep learning model (e.g., such as recurrent neural networks or RNN) to execute the language modeling tasks 302.

The question answering tasks 303 executed by the language model 140 can generally involve generating language model outputs 190 that answer questions or requests posed in natural language text (e.g., such as when the language model 140 operates as a chatbot and/or operates as a search engine to identify content).

The text classification tasks 304 executed by the language model 140 can generally involve generating language model outputs 190 that assign labels or categories to portions of text (e.g., labels indicating the text corresponds to particular service offerings 185 or to categories such as sports, politics, etc.). The text summarization tasks 305 executed by the language model 140 can generally involve generating language model outputs 190 that create a summary of a longer piece of text (e.g., using extractive or abstractive summarization techniques).

The speech recognition tasks 306 executed by the language model 140 can generally involve generating language model outputs 190 that transcribe spoken words into written text.

The NER tasks 307 executed by the language model 140 can generally involve generating language model outputs 190 that identify and classify named entities (e.g., such as people, organizations, and locations) in a piece of text.

The topic modeling tasks 308 executed by the language model 140 can generally involve generating language model outputs 190 that identify the topics and themes present in text or a collection of documents.

The language model 140 described herein can be configured to execute any or all of the NLP tasks 145 mentioned above, as well as other types of NLP tasks 145. Various training datasets 146 can enable the language model 140 to perform these and other NPL tasks 145.

Returning to FIGS. 1A-1B, in some embodiments, the training datasets 146 can be customized or supplemented with domain-specific textual content relating to service offerings 185 (e.g., which may be offered to end-users directly via the multi-modal application 130 and/or a third-party service provider platform 180). A transfer learning procedure 148 can be executed to fine-tune the training of the language model 140 on the domain-specific textual content. For example, the training dataset 146 can be supplemented with text relating to customizing options for providing the service offerings 185 to end-users. The training dataset 146 also can be supplemented with text corresponding to historical user interactions with the service offerings 185. Using this domain-specific content to supplement the training of the language model 140 can enhance or improve communications between the language model 140 and end-users.

In some embodiments, the training datasets 146 also can be customized or supplemented with computer vision outputs 163 generated by the computer vision system 160. The computer vision outputs 163 can include various data or information, including data or information related to classifying images 161 or objects 162, detecting objects 162 in the images 161, etc. The training datasets 146 also can be customized or supplemented to include training or sample outputs 190 generated by the language model 140 based, at least in part, on a consideration of the computer vision outputs 163. Using this computer vision-based content to supplement the training of the language model 140 also can improve the generative ability of the language model 140, as well as the quality, accuracy, and comprehensiveness of the outputs 190 presented to end-users. Additionally, this training data can be utilized to enhance communications between the language model 140 and computer vision system 160.

In certain embodiments, the language model 140 also can include a continuous learning (or incremental) learning framework 147 that enables the language model 140 to continuously learn over time based on interactions with end-users operating the computing devices 110 and/or based on computer vision outputs 163 generated by the computer vision system 160. The continuous learning framework 147 can continuously refine and increase the quality and comprehensiveness of the language model outputs 190 generated for end-users and/or refine the manner in which the language model 140 communicates with the computer vision system 160 (e.g., to better tailor or customize requests to the computer vision system 160 for analyzing images 161).

Additionally, the continuous learning framework 147 also can enable the language model 140 to recall historical interactions with end-users, and utilize the historical interactions to customize service options and/or other information presented to the end-users. For example, in certain embodiments, the continuous learning framework 147 can enable the language model 140 to learn user preferences for service options and/or service offerings 185 based on historical interactions with an end-user. The language model 140 can then customize service options and/or service offerings 185 to the end-user based on the user preferences.

In certain embodiments, the continuous learning framework 147 also can enable the language model 140 to recall visual content (or related computer vision outputs 163) included in images 161 that are processed by the computer vision system 160, and utilize the historical visual content and/or computer vision outputs 163 to customize outputs 190 presented to the end-users. For example, in certain embodiments, the continuous learning framework 147 can leverage computer vision outputs 163 generated over a course of time to customize the outputs 190 presented to the end-users.

The computer vision system 160 can be configured to perform any and all operations described in this disclosure with respect to analyzing images 161 and/or generating computer vision outputs 163 (also referred to as CV outputs 163). For example, the computer vision system 160 may include one or more neural network networks that are configured to execute computer vision tasks 165 associated with classifying images 161 and objects 162, detecting objects 162 in images 161, executing object counting functions, estimating pose information for objects 162 included in the images 161, executing instance and semantic segmentation functions, etc. The computer vision system 160 can be configured to execute other types of computer vision tasks 165 as well.

FIG. 4 discloses exemplary computer vision tasks 165 that can be learned or executed by the computer vision system 160 in accordance with certain embodiments. The exemplary computer vision tasks 165 can include image classification tasks 401, object detection tasks 402, object tracking tasks 403, instance segmentation tasks 404, semantic segmentation tasks 405, pose estimation tasks 406, video analysis tasks 407, content generation tasks 408, and/or other tasks. Each of the tasks can be executed to produce various types of CV outputs 163.

The image classification tasks 401 executed by the computer vision system 160 can generally involve generating CV outputs 163 that assign labels or categories to images 161 and/or objects 162 included in the images 161. The labels can be assigned using binary classification techniques and/or multi-class classification techniques.

The object detection tasks 402 executed by the computer vision system 160 can generally involve generating CV outputs 163 that identify the presence and/or location of objects 162 included in images 161.

The object tracking tasks 403 executed by the computer vision system 160 can generally involve generating CV outputs 163 that identify movements of objects 162 included in images for a video sequence.

The instance segmentation tasks 404 executed by the computer vision system 160 can generally involve generating CV outputs 163 that identify, delineate, and/or segment objects 162 included in images 161. In some cases, the CV outputs 163 also can classify the objects 162.

The semantic segmentation tasks 405 executed by the computer vision system 160 can generally involve generating CV outputs 163 that partition an image 161 into multiple segments or partitions, such that each segment or partition represents a semantically meaningful object 162 or region. In some cases, the CV outputs 163 can include a label for each pixel included in the image 161.

The pose estimation tasks 406 executed by the computer vision system 160 can generally involve generating CV outputs 163 estimating the position and/or orientation of objects 162 in a three-dimensional (3D) space.

The video analysis tasks 407 executed by the computer vision system 160 can generally involve generating CV outputs 163 based on analyzing the content of a video sequence (or images 161 included in the video sequence). In some cases, the video analysis tasks 407 can include identifying patterns, relationships, and trends in a video sequence, as well as extracting meaningful information from the visual and audio elements of the video sequence. Exemplary video analysis tasks 407 can involve identifying objects (e.g., individuals, items, buildings, etc.) in a video, identifying actions or activities taking place in the video (e.g., running, walking, playing sports, etc.), identifying emotions of individuals in the video, etc. In some cases, the video analysis tasks 407 also can provide summarizations of video content.

The content generation tasks 408 executed by the computer vision system 160 can generally involve can involve generating CV outputs 163 that include images and/or videos generated (or altered) by the computer vision system 160. In some cases, the computer vision system 160 may include one or more generative adversarial networks (GANs) that can be utilized to generate new images and/or video sequences, or utilized to alter existing images and/or video sequences.

In some cases, the computer vision system 160 can additionally, or alternatively, execute other types of computer vision tasks 165 (e.g., image or image or object restoration tasks, 3D reconstruction tasks, etc.) and generate other types of CV outputs 163 corresponding to those tasks.

The computer vision system 160 described herein can be configured to execute any or all of the computer vision tasks 165 mentioned above. Various training datasets can enable the computer vision system 160 to perform these computer vision tasks 165. As explained throughout this disclosure, the computer vision outputs 163 generated by these computer vision tasks 165 can be leveraged by the language model 140 in various ways to improve the language model outputs 190.

Returning to FIGS. 1A and 1B, the images 161 provided to, and analyzed by, the computer vision system 160 can include any type of image 161. In certain embodiments, the images 161 can include one or more two-dimensional (2D) images. In certain embodiments, the images 161 may additionally, or alternatively, include one or more three-dimensional (3D) images. The images 161 may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), STEP (Standard for the Exchange of Product Data), etc. Exemplary color spaces or models can include, but are not limited to, sRGB (standard Red-Green-Blue), Adobe RGB, gray-scale, etc.

The images 161 received by the computer vision system 160 can be captured by any type of camera device 111. The camera devices 111 can include any devices that include an imaging sensor, camera, or optical device. For example, the camera devices 111 may represent still image cameras, video cameras, and/or other devices that include image/video sensors. In some embodiments, the camera devices 111 also can be integrated with computing devices 110, such as mobile devices (e.g., smart phones or cell phones), tablet devices, computing devices, desktop computers, etc. The camera devices 111 can be equipped with analog-to-digital (ND) converters and/or digital-to-analog (D/A) converters based on the configuration or design of the camera devices 111.

The images 161 analyzed by the computer vision system 160 can be stored in one or more databases 170, such as image database 172. The images 161 stored in the image database 172 can be correlated with specific end-users (e.g., based on where the images originated from or who provided the images). In some embodiments, the image database 172 also can store the CV outputs 163 generated by the computer vision system 160 based on the images 161, and data that associates the CV outputs 163 with corresponding images 161.

Each of the images 161 (or the corresponding scenes captured in the images) can include one or more objects 162. Generally speaking, any type of object 162 may be included in an image 161, and the types of objects 162 included in an image 161 can vary greatly. The objects 162 included in an image 161 may correspond to various types of inanimate articles (e.g., vehicles, beds, desks, windows, tools, appliances, industrial equipment, curtains, sporting equipment, fixtures, etc.), living things (e.g., human beings, faces, animals, plants, etc.), structures (e.g., buildings, houses, etc.), and/or the like. The images 161 can be provided to the computer vision system 160 for processing and/or analysis.

The structure and configuration of the computer vision system 160 can vary. In certain embodiments, the computer vision system 160 may include a single learning model and, in other embodiments, may include multiple learning models. Regardless of its configuration, the computer vision system 160 can be trained to execute various computer vision tasks 165 described herein.

In certain embodiments, the computer vision system 160 can include a convolutional neural network (CNN) 166, or a plurality of convolutional neural networks 166. Each CNN 166 may represent an artificial neural network configured to analyze images 161 and to execute deep learning functions and/or machine learning functions on the images 161. Each CNN 166 may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs 166 and their corresponding layers can be configured to enable the CNNs 166 to learn and execute various tasks for analyzing, interpreting, and understanding the images, including any of the computer vision tasks 165 described in this disclosure.

In certain embodiments, the computer vision system 160 can additionally, or alternatively, include one or more support vector machines (SVMs) models, one or more decision tree models, one or more random forest models, one or more recurrent neural networks (RNNs), one or more generative adversarial networks (GANs), and/or other types of computer vision models and networks.

In some scenarios, the computer vision system 160 can be configured to extract feature representations from input images 161. The feature representations may represent embeddings, encodings, vectors, features, and/or the like, and each feature representation may include encoded data that represents and/or identifies one or more objects 162 included in an image 161. In some embodiments, the computer vision system 160 also can be trained to utilize the object representations to execute one or more computer vision tasks 165.

The computer vision system 160 can be configured to generate computer vision outputs 163 based on an analysis of the images 161. A computer vision output 163 generated for an image 161 can generally include any information or data associated with analyzing, interpreting, understanding, and/or classifying the image 161 and any objects 162 included in the image 161. In certain embodiments, the computer vision outputs 163 can include information or data that indicates the results of the computer vision tasks 165 performed by the computer vision system 160. For example, the computer vision outputs 163 may include the predictions and/or results associated with performing the image classification tasks 401, object detection tasks 402, object tracking tasks 403, instance segmentation tasks 404, semantic segmentation tasks 405, pose estimation tasks 406, video analysis tasks 407, content generation tasks 408, and/or other computer vision tasks 165.

In certain embodiments, one or more training procedures may be executed to train the computer vision system 160 to perform the computer vision tasks 165 described in this disclosure. The specific procedures that are utilized to train the computer vision system 160 can vary. In some cases, one or more supervised training procedures, one or more unsupervised training procedures, and/or one or more semi-supervised training procedures may be applied to train the computer vision system 160, or certain portions of the computer vision system 160.

In the exemplary system 100 shown in FIGS. 1A-1B, the computer vision system 160 may be stored on, and executed by, the one or more servers 120. In other exemplary systems, the computer vision system 160 can additionally, or alternatively, be stored on, and executed by, the computing devices 110 and/or other devices. For example, in certain embodiments, the computer vision system 160 can be integrated directly into a camera device 111 to enable the camera device 111 to analyze images 161 using the techniques described herein.

Additionally, or alternatively, the multi-modal application 130 can communicate with the computer vision system 160 via API 164. For example, in some cases, the computer vision system 160 can be developed or provided by a third-party (e.g., such as the Google Cloud Vision® service, Amazon Rekognition® service, Microsoft Azure Computing Vision® service, and/or other third-party computer vision services) and the multi-modal application 130 can transmit inputs (e.g., images 161) received from a computing device 110 operated by end-user to the API 164, and can receive computer vision outputs 163 from the computer vision system 160 via the API 164. Additionally, or alternatively, the computer vision system 160 can be integrated directly into the user multi-modal application 130 and/or can be he hosted by the application platform 150.

Additionally, the computer vision system 160 can also be stored as a local application on a computing device 110, or integrated with a local application stored on a computing device 110, to implement the techniques described herein. For example, in certain embodiments, the computer vision system 160 can be integrated with (or can communicate with) various applications including, but not limited to, facial recognition applications, automated vehicle applications, intelligent traffic applications, surveillance applications, security applications, industrial quality control applications, medical applications, agricultural applications, veterinarian applications, image editing applications, social media applications, and/or other applications that are stored on a computing device 110 and/or server 120.

The computer vision outputs 163 generated by the computer vision system 160 can be leveraged in various ways to enhance the outputs 190 of the language model 140. In some scenarios, a computing device 110 (e.g., a smart phone or mobile device) operated by an end-user can capture one or more images 161 that may be analyzed by the computer vision system 160, and computer vision outputs 163 generated by the computer vision system 160 can be utilized to supplement or improve the outputs of the language model 140.

For example, an end-user may query the language model 140 to obtain information about an image 161 identified by the end-user (e.g., to request that the language model 140 identify an item or individual included in the image 161). In response to receiving the query, the language model 140 can communicate with the computer vision system 160 to request an analysis of the image 161, and the computer vision system 160 can execute one or more computer vision tasks 165 (e.g., an object detection task and an object classification task) to identify the item or individual. The computer vision output 163 generated by the computer vision system 160 may include one or more labels identifying the item or individual, and the language model 140 can utilize the label to generate a responsive output 191 responding to the end-user's query.

In another exemplary scenario, an end-user may query the language model 140 to obtain information about a video identified by the end-user (e.g., a query asking what type of vehicle is identified in the video). In response to receiving the query, the language model 140 can communicate with the computer vision system 160 to request an analysis of the video (or images 161 included in the video), and the computer vision system 160 can execute one or more computer vision tasks 165 (e.g., an object detection task, object tracking task, and an object classification task) to identify vehicle. The computer vision output 163 generated by the computer vision system 160 may include one or more labels identifying the vehicle in the video, and the language model 140 can utilize the label to generate a responsive output 191 responding to the end-user's query.

In other examples, the images captured by, or stored on, an end-user's computing device 110 can all be analyzed by the computer vision system 160, and the computer vision system 160 can execute various computer vision tasks 165 to analyze the images 161 (e.g., to identify items, buildings, individuals, or other objects included in the images 161). The analysis of the images 161 can be performed at one time (e.g., when the multi-modal application 130 is installed on the computing device 110) and/or can be performed continuously over time as the individual captures more and more images with the computing device 110. The aggregated analysis information extracted from the images 161 can be utilized to train the learning mechanism of the language model 140, such as to assist the learning model 140 with learning the end-user preferences for particular service offerings 185, locations, business establishments, products, clothing, etc. The language model 140 can learn the user preferences by considering other data as well (e.g., data from previous interactions between the end-user and language model 140 and/or data obtained from third-party service provider platforms 180). The learned user preferences can then be utilized to personalize, customize and/or improve the outputs 190 generated by the language model 140.

In one example, the information extracted from the images 161 by the computer vision system 160 may indicate that the end-user has preference for wearing blue jeans sold by a preferred company. If the end-user submits a query to the language model 140 asking for prices or sales options on pants, the language model 140 may communicate with one or more service provider platforms 180 and generate a responsive output 191 that identifies available options and some of the options can include blue jeans offered by the preferred company.

In another example, the language model 140 may detect a preemptive event indicating that a service provider platform 180 has an ongoing sale in which the blue jeans sold by the preferred company are being offered at a discounted price. In response to detecting this preemptive event, the language model 140 may generate a preemptive output 192 that proactively notifies the end-user and/or presents the end-user with options for purchasing the blue jeans.

In another example, computer vision outputs 163 generated by the computer vision system 160 for an end-user can be stored by the language model 140 for usage in future exchanges with the end-user. For example, the end-user may capture an image 161 of a landmark building at some point in time. The computer vision system 160 may analyze the image 161 and computer vision outputs 163 may be stored by the language model 140 (e.g., by the continuous learning framework 147). Several weeks or months later, the end-user may interact with the language model 140 to discuss a topic relating to the landmark building and the information extracted by the computer vision system 160 may be utilized to generate the outputs 190 relating to the landmark building.

In a further example, an end-user may submit a query via the client interface 135 requesting that the language model 140 identifies images of a cat within a collection of images 161 (e.g., such as a collection of images 161 captured on the end-user's smart phone). In this scenario, the language model 140 may submit a request to the computer vision system 160 to search for the images of the cat. In turn, the computer vision system 160 can execute one or more computer vision tasks 165 (e.g., object detection tasks) to generate a computer vision output 163 identifying images that include a cat. The language model 140 can then generate an output 190 that presents the images 161 to the end-user based on the CV output 163 by the computer vision system 160.

In a further example, an end-user may submit a query via the client interface 135 requesting that the language model 140 provide a summarization or analysis of a video sequence. In this scenario, the language model 140 may submit a request to the computer vision system 160 to identify the requested summarization or video sequence analysis. In turn, the computer vision system 160 can execute one or more computer vision tasks 165 (e.g., video analysis tasks) to generate a computer vision output 163 that summarizes the content of the video sequence and/or provides other types of analysis information related to the video sequence.

In a further example, an end-user may submit a query via the client interface 135 requesting that the language model 140 generate an image or video sequence showing a dog in a garden. In this scenario, the language model 140 may interpret the request and communicate with the computer vision system 160 to initiate a content generation task for generating the image or video sequence. The CV output 163 generated by the computer vision system 160 can be provided to the language model 140 and output via the client interface 135.

The above examples describing usage of computer vision outputs 163 are not intended to be limited. The computer vision outputs 163 can be utilized in many other ways to enhance or improve the outputs 190 generated by the language model 140.

Figure 2:
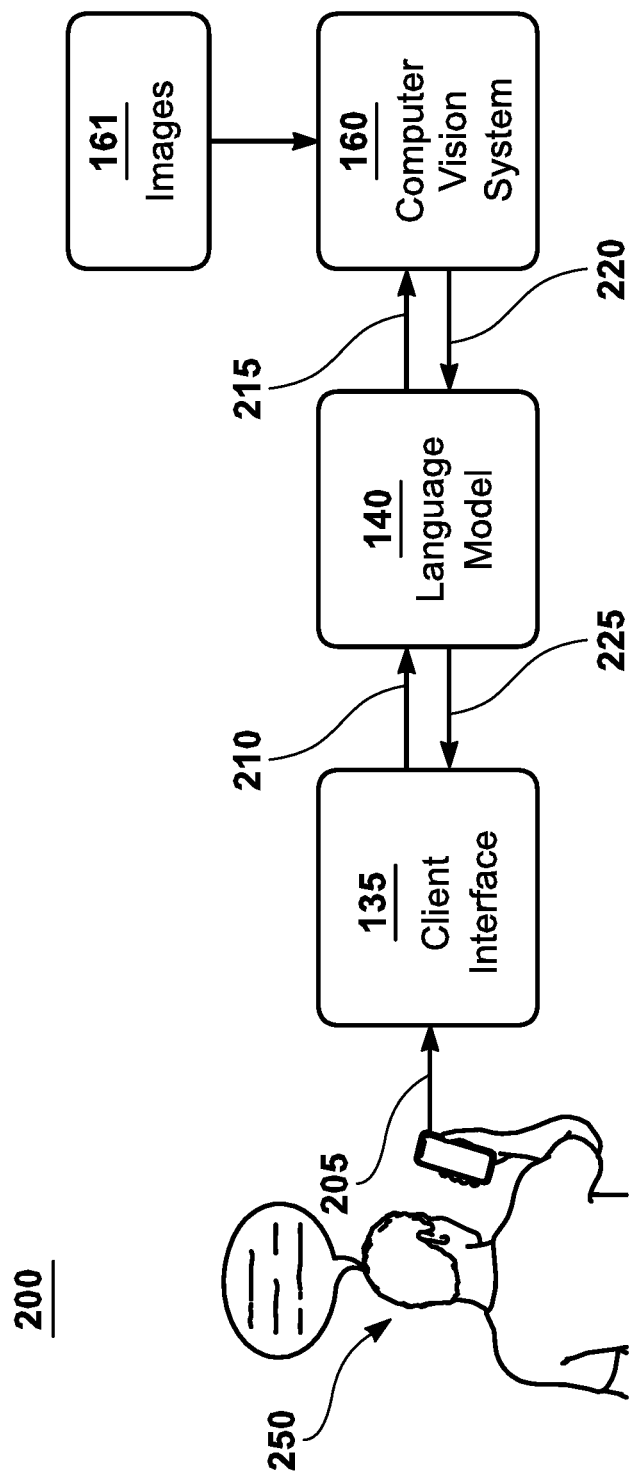
FIG. 2 is a block diagram illustrating an exemplary process flow for generating outputs using a language model in accordance with certain embodiments.

FIG. 2 is block diagram that illustrates an exemplary process flow 200 demonstrating how the language model 140 can interact with the computer vision 160 to generate outputs 190 according to certain embodiments. The description of FIG. 2 includes an example of how the process flow 200 can be applied in connection with service offerings 185. However, it should be recognized that the process flow 200 can be applied to customize language model outputs 190 in many other contexts as well.

At step 205, an end-user 250 provides an input to a client interface 135, which can be provided via a front-end of the multi-modal application 130. The input can be a text input and/or a voice or audio input. The content of the input can vary. In some cases, the input can include a request pertaining to a service offering 185 provided via the multi-modal application 130 and/or provided by a third-party service provider platform 180. In other cases, the input may be unrelated to service offerings 185.

In one example, the end-user input can request information about a service offering 185 corresponding to specific laptop model. The end-user may desire to know various aspects about the laptop model, such as technical specifications and physical specifications (e.g., color, size, dimensions, etc.) of the laptop model.

At step 210, the input received via the client interface 135 is provided to language model 140. In some cases, the input may be provided via an API 142 of the language model 140 (e.g., transmitted over a network 105 to a server 120 that hosts the language model 140). Additionally, or alternatively, the language model 140 can be integrated directly with the client interface 135 and/or a front-end of the multi-modal application 130. Upon receiving the input, the language model 140 can analyze the input to interpret its meaning and/or to understanding the intentions of the end-user 250.

Staying with the above example, the language model 140 may analyze the end-user's request and understand that the end-user is requesting information or specifications relating to the laptop model. The language model 140 may have knowledge of, or access to certain data sources that provide technical specifications (e.g., memory size, processor details, etc.) for the laptop model, but may have knowledge of certain physical specifications of the laptop model (e.g., color, size, dimensions, etc.). In some cases, the language model 140 may communicate with the service provider platform 180 to obtain various information relating to the laptop model, such as technical specifications and images relating to the laptop model.

At step 215, the language model 140 initiates a communication exchange with the computer vision system 160. In some cases, the communication exchange can involve the language model 140 transmitting a request to the computer vision system 160 to analyze one or more images 161. The computer vision system 160 can be configured to execute various computer vision tasks 165 to analyze each of the images 161 including, but not limited to, image classification tasks 401, object detection tasks 402, object tracking tasks 403, instance segmentation tasks 404, semantic segmentation tasks 405, pose estimation tasks 406, video analysis tasks 407, content generation tasks 408, and/or other tasks.

Staying with the above example, the language model 140 can generate and transmit a request to the computer vision system 160 to analyze one or more images 161 corresponding to the laptop model. In some cases, the request may include the one or more images 161 and/or may identify the location of the one or more images 161. The one or more images 161 may include objects 162 corresponding to the laptop model. Upon receiving the request, the computer vision system 160 can execute one or more computer vision tasks 165 (e.g., object detection and/or classification tasks) to analyze the one or more images 161.

At step 220, the computer vision system 160 analyzes the one or more images 161 identified in the request, generates one or more CV outputs 163 based on the analysis, and transmits the one or more CV outputs 163 to the language model 140. The language model 140 utilizes the one or more CV outputs 163 to generate a language model output 190 for responding to the end-user's request. The output 190 may be generated based on both the one or more CV outputs 163 and other information learned or obtained by the language model 140 (e.g., such as information received from one or more service provider platforms 180 and/or information learned during training of the language model 140).

Staying with the above example, the computer vision system 160 may analyze the one or more images 161 corresponding to the laptop model and execute computer vision tasks 165 to generate CV outputs 163 identifying physical specifications for the laptop model (e.g., such as color, size, dimensions, etc.). These CV outputs 163 can then be transmitted to the language model 140. Upon receiving the CV outputs 163, the language model 140 can utilize the CV outputs 163 comprising details on the physical specifications of the laptop model, along with other knowledge of the other technical specifications, to generate a responsive output 191. In this manner, the CV outputs 163 generated by the computer vision system 160 are able to supplement and/or enhance the output 190 generated by the language model 140.

At step 225, the language model 140 provides the output 190 to the client interface 135 for presentation to the end-user 250. In some cases, the language model output 190 includes a human language response responding to the end-user's request and the human language response is output via the client interface 135. In some cases, the language model output 190 additionally, or alternatively, can include one or more images 161 (e.g., such as images 161 identified or generated by the computer vision system 160). In some cases, the output 190 also may include interactive options (e.g., buttons) that enable the end-user 250 to place an order for a service offering 185.

Staying with the above example, the responsive output 191 generated by the language model 140 may include a human language response providing technical and physical specifications for the laptop model. In some cases, the responsive output 191 also can include one or more images 161 of the laptop model and/or interactive options that enable the end-user to purchase or order the laptop model. The responsive output 191 can be presented to the end-user via the client interface 135 of the multi-modal application 130.

It should be noted that the process flow 200 identified in FIG. 2 is only one example of how the language model 140 can utilize CV outputs 163 to generate language model outputs 190. For example, in other scenarios, the analysis performed by the computer vision 160 can be performed as a pre-processing operation, and the CV outputs 163 generated by the computer vision system 160 can be provided to the language model 140 prior to the end-user submitting the input in step 205. In this scenario, the communication exchange between the language model 140 and computer vision system 160 is performed prior to any end-user interaction and the language model already has the knowledge provided by CV outputs 163 when the user request is submitted via the client interface 135 of the multi-modal application. The language model 140 can utilize CV outputs 163 generated by the computer vision system 160 to generate language model outputs 190 in other scenarios as well.

Figure 6:
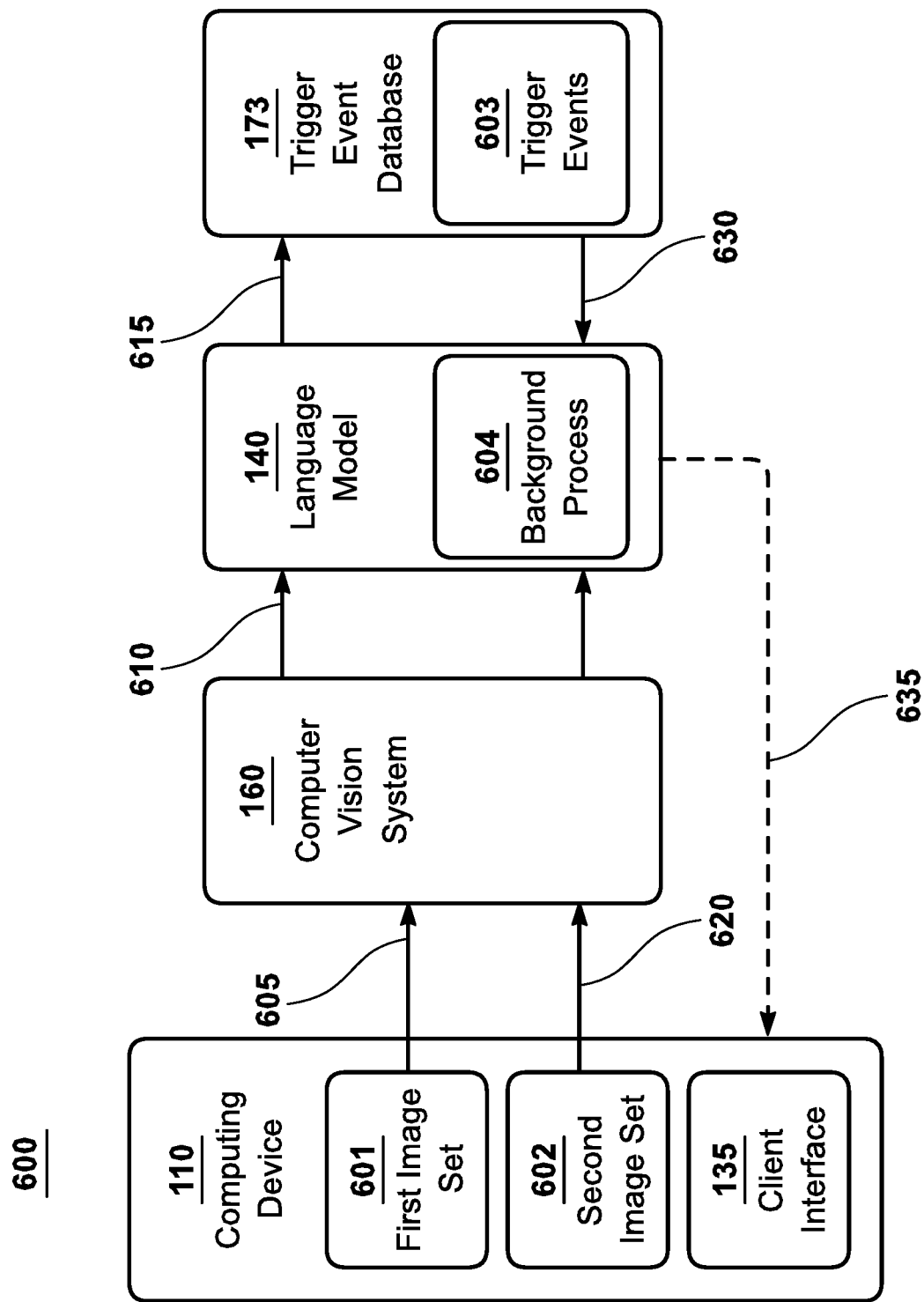
FIG. 6 is a block diagram illustrating an exemplary process flow for enhancing interactions with end-users in accordance with certain embodiments.

FIG. 6 illustrates an exemplary process flow 600 for utilizing visual content to enhance language model outputs 190 and interactions with end-users.

In step 605, a computing device 110 operated by an end user captures and/or stores a first set of images 601, and the first set of images 601 are provided to the computer vision system 160 for analysis. The first set of images 601 may include one or more images 161. In some scenarios, the first set of images 601 may be sent to the computer vision system 160 on an individual basis (e.g., each image 161 may be sent independently after the image 161 is captured). In other scenarios, the multiple images 601 may be sent at the same time to enable a batch analysis to be performed by the computer vision system 160.

Upon receiving the first set of images 601, the computer vision system 160 executes one or more computer vision tasks 165 on the first set of images 601, and generates CV outputs 163 corresponding to first set of images 601. For example, in some instances, the computer vision system 160 may execute one or more object detection, object classification, and/or image classification tasks on each image 161 included in the first set of images 601 to identify or classify target objects or target images included in each of the images 161. The computer vision system 160 can execute other types of computer vision tasks 165 and generate other types of CV outputs 163 as well (including any of the computer vision tasks 165 and/or CV outputs 163 discussed herein).

In step 610, the CV outputs 163 generated by the computer vision system 160 for the first set of images 601 are provided to, or accessed by, the language model 140. The language model 140 (or other component of the multi-modal application 130 in communication with the language model 140) executes a background process 604 that automatically analyzes the CV outputs 163 to detect or identify one or more trigger events 603.

Each trigger event 603 may represent a data point (or series of data points) extracted from the first set of images 601 that can be utilized to enhance the outputs 190 generated by the language model 140. The trigger events 603 may correspond to visual prompts that cause the language model 140 to generate or supplement content of the outputs 190. In some scenarios, detection of a trigger event 603 may be utilized by the language model 140 to preemptively or proactively initiate an interaction with an end-user with a respect to a particular topic. In other scenarios, detection of a trigger event 603 can allow the language model 140 to enhance, supplement or adapt the outputs 190 generated during a current or ongoing interaction with the end-user.

The background process 604 can execute various types of weighting, correlation, or analysis functions to identify the trigger events 603. For example, in some scenarios, trigger events may be generated or identified based on an analysis of how frequently certain objects appear in images 161 taken by an end-user, how frequently an end-user mentions a topic that corresponds to a label for an object or image, etc. Trigger events 603 also may be detected based on patterns that in the images and/or patterns in an end-user's conversations or interactions. These and other analysis functions may be utilized to flag or identify topics that are of interest to an end-user, which, in turn, can be utilized to identify and store corresponding trigger events 603. Additionally, in some cases, the language model 140 can include predetermined or preprogrammed triggered events that are determined by a developer of the multi-modal application 130.

In one example, a trigger event 603 can be identified which corresponds to the detection of a particular object 162, or a particular object category, in an image 161 (e.g., detection of a person, business location, product, etc. in an image). In another example, a trigger event 603 can be identified which corresponds to a classification of an image with a particular label (e.g., which detects a scene associated with a beach, neighborhood, event, etc. depicted in an image 161). Trigger events 603 also may correspond to various other data points that are extracted from the first set of images 601.

In step 615, the language model 140 transmits the detected trigger events 603 to a trigger event database 173 for storage. In some embodiments, the trigger event database 173 may be a database that is included in, or maintained by, the language model 140. Additionally, or alternatively, the trigger event database 173 may be a separate database that is maintained on, or accessible through, the multi-modal application 130.

In step 620, the computing device 110 operated by the end user captures and/or stores a second set of images 602, and the second set of images 601 are provided to the computer vision system 160 for analysis. The second set of images 602 may include one or more images 161 that are captured at a later point in time relative to the first set of images 602. Again, upon receiving the second set of images 602, the computer vision system 160 executes one or more computer vision tasks 165 on the second set of images 602, and generates CV outputs 163 corresponding to second set of images 602 (e.g., which may be generated based on object detection, object classification, image classification, and/or other types of computer vision tasks 165).

In step 630, the trigger events 603 stored in the trigger event database 173 are provided to, or accessed by, the language model 140. The background process 604 executed by the language model 140 analyzes the CV outputs 163 generated for the second set of images 602 and compares the CV outputs 163 to the trigger events 603. If no trigger event 603 is matched or detected based on this comparison, no action is taken. If one or more trigger events 603 are matched or detected based on this comparison, the process flow proceeds to step 635.

In certain embodiments, the background process 604 may operate in a manner that is not apparent to the end-user. In some cases, the background process 604 may be continuously executed in the background of the multi-modal application 130 to analyze CV outputs 163 and/or compare CV outputs 163 to the trigger events 603. In other cases, the background process 604 may operate on a responsive or intermittent basis such that it is activated or utilized in certain scenarios (e.g., in scenarios when images are captured by the end-user or when an analysis of CV outputs 163 and/or trigger events 603 is needed).

In certain embodiments, the background process 604 can be configured to make determinations regarding whether or not the language model 140 should engage in a conversation or interaction with an end-user based on analysis of the CV outputs 163 and/or trigger events 603 (e.g., whether or not the language model 140 should generate a preemptive output 192 or responsive output 191 based on a given set of circumstances). The background process 604 also can determine when such interactions should occur (e.g., can identify an appropriate time for interacting with the end-user in connection with a particular topic). In some cases, the aforementioned determinations can be based, at least in part, on information gleaned from images 161.

For example, the computer vision tasks 165 executed by the computer vision system 160 on the second set of images 602 can include sentiment analysis functions (e.g., facial expression classification functions) that can be utilized to determine or predict a mood of end-user (e.g., indicating or predicting whether the end-user is happy, sad, angry, etc.). The results of the sentiment analysis function can be utilized by the background process 604 to determine whether or not to interact with an end-user. In one example, the background process 604 may decide to forego sending a preemptive output 192 in scenarios where the end-user is predicted to be in a mood that suggests the end-user currently does not wish to engage with the language model 140. In other examples, a background process 604 may decide it is appropriate to interact with an end-user in scenarios where the end-user's mood is neutral or willing to engage with the language model 140.

The background process 604 also can be configured to make determinations regarding when the language model 140 should interact with end-users. For example, the background process 604 may identify a trigger event 603 corresponding to an ongoing sale at a merchant location that is a located an hour in ahead on a route being travelled by the end-user. Rather than interacting with the end-user at that time, the background process 604 may cause the language model 140 to delay interactions with the end-user until the end-user is located closer to the merchant location (e.g., within ten minutes of the merchant location or within one mile of the merchant location). In another example, the CV outputs 163 generated by the sentiment analysis functions may indicate the end-user is not currently in an engaging mood, and the background process 604 may cause the language model 140 to delay interactions with the end-user for a later point in time.

The ability of the background process 604 to make determinations regarding whether or not to interact with the end-user (and when is appropriate to interact with the end-user) can enhance the functionality of the language model 140, and permits the language model 140 to exhibit tactfulness or discretion, thereby facilitating more human-like interactions between the end-user and the language model 140.

In step 635, in response to one or more trigger events 603 matching the CV outputs generated for the second set of images 602, the language model 140 generates an output 190 or enhances an output 190 presented to the end-user via the client interface 135. The CV outputs 163 extracted from the second set of images 602 can represent visual prompts that trigger the language model 140 to interact or customize outputs 190 presented to end-users in various ways. In many instances, the output 190 can include content relating to the one or more detected trigger events 603 and/or relating to the CV outputs 163 generated for the second set of images 602 (e.g., may include content related to a product, item, individual, building, or other object identified in the second set of images 602).

The content of the output 190 also may be based on other information learned by the language model 140 (e.g., prior content learned by the language model 140 and/or prior conversations stored in the language model interaction database 171). Additionally, in some scenarios, the output 190 generated by the language model 140 is a preemptive output 191 that is generated in response to the detection of the one or more trigger events 603. In other scenarios, the output 190 may be a responsive output 191 that is generated during an ongoing interaction or exchange between the language model 140 and end-user.

As mentioned above the computer vision system 160 may execute sentiment analysis and/or facial expression recognition functions on the images 161 received by the computer vision system 160. The results of these functions can be utilized by the background process 604 to customize or modify content of outputs 190 generated by the language model 140. For example, the textual content included in a responsive output 191 and/or preemptive output 192 may be modified to include a softened tone, exclamatory tone, formal tone, informal tone, sarcastic tone, respectful tone, appreciative tone, and/or other tone based on the predicted mood of the end-user. Again, the results of the sentiment analysis and/or facial expression recognition functions can enhance the ability of the language model 140 to exhibit tactfulness or discretion, thereby facilitating more human-like interactions between the end-user and the language model 140.

Additionally, in certain embodiments, the outputs 190 generated by the language model 140 may be based, at least in part, on mapping information stored by the language model 140. For example, in some embodiments, the background process 604 may store, generate and/or utilize mapping information that can be applied to map trigger events to certain types of interactions with end-users, and this mapping information can be utilized to generate or enhance the output 190 generated by the language model 140.

In one example, the mapping information may correlate a trigger event 603 (e.g., one that is based on detection of a particular product in an image 161) with a shopping-type interaction, such that detection of the triggering event 603 causes the language model 140 to generate an output 190 comprising options for a purchasing a product depicted in an image 161 and/or obtaining a discount for the product. In another example, the mapping information may correlate a trigger event 603 (e.g., one that is based on detection of particular individuals in an image 161) with an interaction that presents historically collected images 161 stored on the end-user's computing device 110 to the end-user via the client interface 135. In a further example, the mapping information may correlate a trigger event 603 with an interaction that presents the end-users with a textual description or information related to object or scene depicted in an image 161. The mapping information can correlate the trigger events 603 with many other types of interactions as well.

The above-described process flow 600 can be utilized to enhance interactions with end-users in many different scenarios and contexts. A few non-limiting examples are described below.

In one example, the background process 604 may cause a trigger event 603 to be stored which corresponds to the detection of an object 162, such as a handbag product. In response to an end-user's device capturing an image 161, the computer vision system 160 can analyze the image 161 to determine whether the image 161 includes an object 162 corresponding to the handbag. The background process 604 can compare the CV outputs 163 to the stored trigger event 603. If the handbag is not detected in the image 161, no action is taken and the background process 604 may attempt to match the CV outputs 163 with other stored trigger events 603. However, if the background process 604 detects a match with the trigger event 603 (e.g., indicating that the image 161 includes an object corresponding to the handbag), then the mapping information associated with the trigger event 603 may cause the language model 140 to initiate a certain type of interaction with end-user. For example, in some cases, the mapping information can cause the language model 140 to communicate with one or more service provider platforms 180 to obtain pricing options for the handbag, and generate an output 190 with information summarizing the pricing options. In this manner, the detection of the handbag in the image 161 served as a visual prompt that caused the language model 140 to interact with the end-user and provide useful information to the end-user.

In another example, the background process 604 may cause a trigger event 603 to be stored which corresponds to the classification of an image 161, such as an image that is classified or labeled as depicting a landmark building. In response to an end-user's device capturing an image 161, the computer vision system 160 can analyze the image 161 to determine whether the image 161 corresponds to, or includes an object relating to, the landmark building. If the background process 604 detects a match with the trigger event 603, the mapping information associated with the trigger event 603 may cause the language model 140 to present the end-user with various details pertaining to the landmark building (e.g., information on the history and context related the landmark building).

In a further example, the background process 604 may cause a trigger event 603 to be stored which corresponds detecting objects 162 in an image captured on a particular date, such as an image of the end-user and end-user's spouse on their anniversary. In response to an end-user's device capturing an image 161, the computer vision system 160 can analyze the image 161 to determine whether the image 161 includes objects corresponding to the end-user and end-user's spouse. The background process 604 can determine if the image matches the trigger event 603 (e.g., whether the image was captured on the particular date identified in the trigger event 603 and whether the CV outputs 163 identified the coupled as being objects 162 in the image). In the event that a match is detected, the background process 604 can cause the language model 140 to generate an output 190 that presents images of the couple on the same date in previous years along with a textual message (e.g., "Happy Anniversary! Here are some images from your previous anniversaries.").

It should be noted that the exemplary outputs 190 described above (as well as any outputs 190 described herein) can be customized or enhanced based on prior interactions between end-users and the language model 140, in addition to customizing outputs 190 based on the visual information extracted by the computer vision system 160. For instance, in the above example, the language model 140 may have learned the names of the end-user and the end-user's spouse based on prior interactions with the end-user (e.g., which may be stored in the language model interaction database 171). Thus, in addition to customizing the output 190 based on the visual information obtained from the image 161, the output 190 also may be customized to include the names of the end-user and the end-user's (e.g., "Happy Anniversary Jim and Marylyn!") and/or other relevant information that was learning by the language model 140 based on prior exchanges or conversations.

Figure 5:
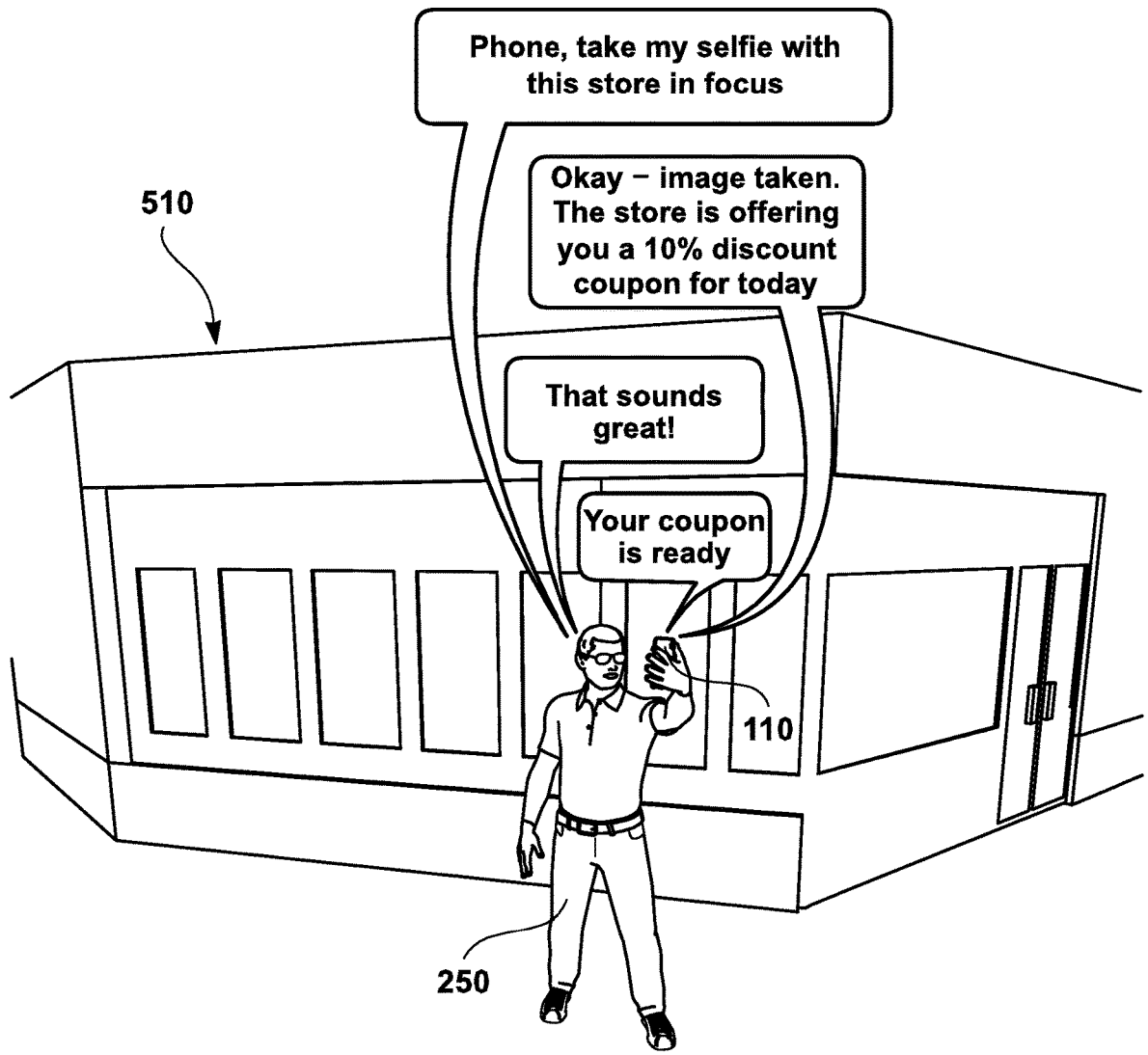
FIG. 5 is an illustration demonstrating an exemplary scenario involving usage of a multi-modal machine learning system to communicate with an end-user in accordance with certain embodiments.

FIG. 5 is an illustration demonstrating an example of a language model 140 generating an output 190 for an end-user 250 based, at least in part, on an analysis of an image 161 by the computer vision system 160. In this example, the end-user 250 is operating a computing device 110 that includes the multi-modal application 130, and the end-user 250 has captured an image 161 (e.g., a "selfie") in front of a business location 510. In response to capturing the image 161, the language model 140 can automatically submit a request for the computer vision system 160 to analyze the image 161. In some embodiments, the analysis performed by the computer vision system 160 may include execution of object detection and/or image classification tasks, and the computer vision system 160 may generate a CV output 163 identifying the business location 510 as Merchant A. Both the image 161 and the CV outputs 163 may be stored in a database 170 (e.g., image database 172). The CV output 163 generated by the computer vision system 160 can be utilized to enhance outputs 190 generated by the language model 140, including both responsive outputs 191 and preemptive outputs 192.

In one example, in response to detecting that the end-user 250 is located near Merchant A, the language model 140 may preemptively communicate with a service provider platform 180 associated with Merchant A to determine if any coupons are currently being provided by Merchant A. The language model 140 can then generate a preemptive output 192 that presents the coupons to the end-user 250 via the client interface 135 of the multi-modal application 130. In response to receiving the preemptive output 192, the end-user 250 may download or accept the coupons, and provide a confirmation that the end-user intends to visit Merchant A. All of the interactions between the language model 140 and the end-user 250 may be stored in a database 170 (e.g., language model interaction database 171).

Staying with the above example, at a later point in time, the end-user may be engaged in a conversation with the language model 140 relating to planning a trip to visit a park, which happens to be located near Merchant A. During this exchange, the end-user may obtain directions to the park from the language model 140, and may request a listing of activities located near the park. Based on the previously stored interaction data (including the information previously stored in the language interaction database 171 and image database 172), the language model 140 may generate a listing of available activities, which includes shopping at Merchant A as one of the activity options. The end-user may then select desired options from the listing to aid the language model 140 in generating an itinerary for the trip to the park.

Again, all of these interactions can be saved in a database 170 (e.g., language model interaction database 171) to continuously aggregate information relevant for the end-user, and these interactions may be leveraged in future exchanges with the end-user. In this manner, the analyses of the computer vision system 160 and the language model 140 can synergistically optimize interactions with end-users in a meaningful manner.

FIG. 7 illustrates a flow chart for an exemplary method 700 according to certain embodiments. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, system 100, multi-modal application 130 and/or application platform 150 can be configured to perform method 700 and/or one or more of the steps of method 700. In these or other embodiments, one or more of the steps of method 600 can be implemented as one or more computer instructions configured to run at one or more processing devices 102 and configured to be stored at one or more non-transitory computer storage devices 101. Such non-transitory memory storage devices 101 can be part of a computer system such as system 100, multi-modal application 130 and/or application platform 150.

In step 710, a multi-modal application 130 is provided that includes: (a) a computer vision system 160 configured to execute one or more computer vision tasks 165 and generate computer vision outputs 163; and (b) a client interface 135 that facilitates interactions between an end-user and a language model 140 that generates textual outputs for communicating with the end-user. In some cases, the computer vision system 160 can include one more CNNs 166, and the language model 140 can include one or more GPT models 141.

In step 720, one or more images 161 are received at the computer vision system 160. In some scenarios, the one or more images 161 can be generated by a camera device 111 included on a mobile device (or other computing device 110) operated by the end-user. In other scenarios, the one or more images 161 may be obtained from one or more service provider platforms 180 over a network 105. The one or more images 161 may be received from other sources as well.

In step 730, at least one computer vision task 165 is executed on the one or more images 161 using the computer vision system 160 to generate one or more computer vision outputs 163. The one or more computer vision outputs 163 can include image analysis data generated by image classification tasks 401, object detection tasks 402, object tracking tasks 403, instance segmentation tasks 404, semantic segmentation tasks 405, pose estimation tasks 406, and/or other computer vision tasks 165.

In step 740, one or more natural language processing (NPL) tasks 145 are executed by the language model 140 that utilize the one or more computer vision outputs 163 to generate an output 190 in connection with interacting with the end-user. The output 190 generated by the language model 140 can include data generated by text generation tasks 301, language modeling tasks 302, question answering tasks 303, text classification tasks 304, text summarization tasks 305, speech recognition tasks 306, NER tasks 307, topic modeling tasks 308, and/or other NPL tasks 145. In generating the output 190, the language model 140 can utilize both the computer vision outputs 163 and other knowledge learned by the language model 140.

In step 750, the output 190 is provided to the end-user via the client interface of the multi-modal application 130.

As evidenced by the disclosure herein, the inventive techniques set forth in this disclosure are rooted in computer technologies that overcome existing problems in known language models, including problems related to generating suboptimal outputs that only consider certain forms of information (e.g., textual information). The techniques described in this disclosure provide a technical solution (e.g., one that utilizes various AI language models and computer vision models) for overcoming the limitations associated with known techniques. This technology-based solution marks an improvement over existing capabilities and functionalities related to generating natural language outputs and responses by integrating a computer vision system in manner that permits the language model to consider other forms of inputs in generating the outputs and responses.

In many embodiments, the techniques described herein can provide a practical application and several technological improvements. In some embodiments, the techniques described herein can generate outputs that are more accurate and comprehensive, and which consider inputs from multiple modalities. These techniques described herein can provide a significant improvement over conventional approaches of generating outputs and responses using language models. Additionally, in many embodiments, the techniques described herein can advantageously provide an improve end-user experiences by generating high-quality language model outputs that more accurately or comprehensively respond to queries or requests submitted by end-users In many embodiments, the techniques described herein can be used continuously at a scale that cannot be reasonably performed using manual techniques or the human mind. For example, training the language model and/or computer vision models described herein can involve an analysis on voluminous text and millions of images.

Furthermore, in a number of embodiments, the techniques described herein can solve a technical problem that arises only within the realm of computer networks, because machine learning does not exist outside the realm of computer networks.

In certain embodiments, a method is implemented via execution of computing instructions by one or more processors and stored on one or more non-transitory computer-readable storage devices. The method comprises: providing a multi-modal application that includes: a computer vision system configured to execute one or more computer vision tasks and generate computer vision outputs; and a client interface that facilitates interactions between an end-user and a language model that generates language model outputs for communicating with the end-user; receiving, by the computer vision system, one or more images; executing, by the computer vision system, at least one computer vision task on the one or more images to generate one or more computer vision outputs; executing, by the language model, one or more natural language processing (NPL) tasks that utilize the one or more computer vision outputs to generate a language model output in connection with interacting with the end-user; and providing the language model output to the end-user via the client interface of the multi-modal application.

In certain embodiments, a system comprises one or more processors and one or more non-transitory computer-readable storage devices storing computing instructions configured to run on the one or more processors and cause the one or more processors to execute functions comprising: providing a multi-modal application that includes: a computer vision system configured to execute one or more computer vision tasks and generate computer vision outputs; and a client interface that facilitates interactions between an end-user and a language model that generates language model outputs for communicating with the end-user; receiving, by the computer vision system, one or more images; executing, by the computer vision system, at least one computer vision task on the one or more images to generate one or more computer vision outputs; executing, by the language model, one or more natural language processing (NPL) tasks that utilize the one or more computer vision outputs to generate a language model output in connection with interacting with the end-user; and providing the language model output to the end-user via the client interface of the multi-modal application.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method implemented via execution of computing instructions by one or more processors and stored on one or more non-transitory computer-readable storage devices, the method comprising:
    providing a multi-modal application that includes:
        a computer vision system configured to execute one or more computer vision tasks and generate computer vision outputs; and
        a client interface that facilitates interactions between an end-user and a language model that generates language model outputs for communicating with the end-user;
    executing, using the computer vision system, at least one computer vision task on an image to generate a computer vision output;
    comparing the computer vision output generated by the computer vision system with one or more trigger events;
    in response to detecting a match between the computer vision output and the one or more trigger events, executing, by the language model, at least one natural language processing (NLP) task to generate a preemptive output; and
    outputting the preemptive output via the client interface.

2. The method of claim 1, wherein:
    executing the at least one computer vision task comprises executing a classification task or an object detection task related to a service offering; and
    the preemptive output comprises information pertaining to the service offering.

3. The method of claim 2, wherein:
    in response to detecting the match the between the computer vision output and the one or more trigger events, the language model communicates with one or more service provider platforms over a network to obtain information related to the service offering; and
    the language model generates the preemptive output, at least in part, using the information obtained from the service provider platform.

4. The method of claim 2, wherein the service offering corresponds to a ride hailing service offering or a lodging service offering.

5. The method of claim 1, wherein:
    the language model is configured to learn one or more preferences for the end-user;
    the one or more trigger events are identified based, at least in part, on the one or more preferences learned by the language model; and
    the preemptive output is generated based, at least in part, on the one or more preferences.

6. The method of claim 1, wherein:
    the multi-modal application executes a background process; and
    the background process is configured to determine whether the language model should preemptively initiate a conversation or an interaction with the end-user.

7. The method of claim 6, wherein:
    the background process is configured to receive the computer vision outputs generated by the computer vision system;
    the background process is further configured to determine whether any of the one or more trigger events are applicable to the computer vision outputs generated by the computer vision system; and
    in response to detecting a match between the computer vision output and the one or more trigger events, the background process causes the language model to generate the preemptive output.

8. The method of claim 1, wherein:
the at least one computer vision task executed by the computer vision system is selected from a group consisting of: a classification task; an object detection task; an object tracking task; an instance segmentation task; a semantic segmentation task; a pose estimate task; a video analysis task; and a content generation task; and
the at least one natural language processing (NLP) task executed by the computer vision system is selected from the group consisting of: a text generation task; a language modeling task; a text summarization task.

9. A system comprising:
one or more processors; and
one or more non-transitory computer-readable storage devices storing computing instructions configured to be executed on the one or more processors and cause the one or more processors to execute functions comprising:
providing a multi-modal application that includes:
a computer vision system configured to execute one or more computer vision tasks and generate computer vision outputs; and
a client interface that facilitates interactions between an end-user and a language model that generates language model outputs for communicating with the end-user;
executing, using the computer vision system, at least one computer vision task on an image to generate a computer vision output;
comparing the computer vision output generated by the computer vision system with one or more trigger events;
in response to detecting a match between the computer vision output and the one or more trigger events, executing, by the language model, at least one natural language processing (NLP) task to generate a preemptive output; and
outputting the preemptive output via the client interface.

10. The system of claim 9, wherein:
executing the at least one computer vision task comprises executing a classification task or an object detection task related to a service offering; and
the preemptive output comprises information pertaining to the service offering.

11. The system of claim 10, wherein:
in response to detecting the match the between the computer vision output and the one or more trigger events, the language model communicates with one or more service provider platforms over a network to obtain information related to the service offering; and
the language model generates the preemptive output, at least in part, using the information obtained from the service provider platform.

12. The system of claim 10, wherein the service offering corresponds to a ride hailing service offering or a lodging service offering.

13. The system of claim 9, wherein:
the language model is configured to learn one or more preferences for the end-user;
the one or more trigger events are identified based, at least in part, on the one or more preferences learned by the language model; and
the preemptive output generated by the language model is related to the one or more preferences.

14. The system of claim 9, wherein:
the multi-modal application executes a background process; and
the background process is configured to determine whether the language model should preemptively initiate a conversation or an interaction with the end-user.

15. The system of claim 14, wherein:
the background process is configured to receive the computer vision outputs generated by the computer vision system;
the background process is further configured to determine whether any of the one or more trigger events are applicable to the computer vision outputs generated by the computer vision system; and
in response to detecting a match between the computer vision output and the one or more trigger events, the background process causes the language model to generate the preemptive output.

16. The system of claim 9, wherein:
the at least one computer vision task executed by the computer vision system is selected from a group consisting of: a classification task; an object detection task; an object tracking task; an instance segmentation task; a semantic segmentation task; a pose estimate task; a video analysis task; and a content generation task; and
the at least one natural language processing (NLP) task executed by the computer vision system is selected from the group consisting of: a text generation task; a language modeling task; a text summarization task.

17. A system comprising:
one or more processor means; and
one or more non-transitory storage means storing computing instructions configured to be executed on the one or more processor means and cause the one or more processor means to execute functions comprising:
providing a multi-modal application means that includes:
a computer vision means configured to execute one or more computer vision tasks and generate computer vision outputs; and
an interface means that facilitates interactions between an end-user and a language model means that generates language model outputs for communicating with the end-user;
executing, using the computer vision means, at least one computer vision task on an image to generate a computer vision output;
comparing the computer vision output generated by the computer vision means with one or more trigger events;
in response to detecting a match between the computer vision output and the one or more trigger events, executing, by the language model means, at least one natural language processing (NLP) task to generate a preemptive output; and
outputting the preemptive output via the interface means.

18. The system of claim 17, wherein:
executing the at least one computer vision task comprises executing a classification task or an object detection task related to a service offering; and
the preemptive output comprises information pertaining to the service offering.

19. The system of claim 17, wherein:
the language model means is configured to learn one or more preferences for the end-user;

the one or more trigger events are identified based, at least in part, on the one or more preferences learned by the language model means; and the preemptive output generated by the language model means is related to the one or more preferences.

20. The system of claim 17, wherein:

the multi-modal application means executes a background process; and the background process is configured to determine whether the language model means should preemptively initiate a conversation or an interaction with the end-user.

\* \* \* \* \*